United States Patent [19]

Spencer

[11] Patent Number: 4,813,152

[45] Date of Patent: Mar. 21, 1989

[54] CLEARANCE GAUGE FOR SETTING A TOOL ABOVE A WORKPIECE

[76] Inventor: Stephen C. Spencer, 2815 Spear Ave., Glenside, Pa. 19056

[21] Appl. No.: 95,630

[22] Filed: Sep. 14, 1987

[51] Int. Cl.⁴ .............................................. B27G 23/00
[52] U.S. Cl. ......................................... 33/638; 33/832
[58] Field of Search ................ 33/172 B, 638, 169 R, 33/148 E, 641, 642, 639, 630, 430, 637

[56] References Cited

U.S. PATENT DOCUMENTS

| | | | |
|---|---|---|---|
| 2,242,151 | 5/1941 | Sisson | 33/172 B |
| 2,657,468 | 11/1953 | Lyons | 33/172 B |
| 3,222,788 | 12/1965 | Neslund | 33/148 E |
| 3,628,496 | 12/1971 | Schmitt | 33/640 |
| 3,673,694 | 7/1972 | Adam et al. | 33/172 B |

Primary Examiner—William D. Martin, Jr.
Attorney, Agent, or Firm—Gregory J. Gore

[57] ABSTRACT

A lever-actuated dial gauge supported above a workpiece by a base block. The lever includes a pedal portion which, when parallel to the workpiece, has a working clearance beneath it. When setting the height of machine tools above a workpiece, an operator may exceed the set point clearance without making a hard contact and thereby preventing damage to the machine tool.

7 Claims, 2 Drawing Sheets

CLEARANCE GAUGE FOR SETTING A TOOL ABOVE A WORKPIECE

FIELD OF THE INVENTION

This device relates measurement instruments used with machine tools and machining operation.

BACKGROUND OF THE INVENTION

Many types of measurement instruments have been used to determine the clearance between machine elements. The most simple mechanical types are generally referred to as "feeler" gauges. A feeler gauge contains a plurality of gauged elements of known thickness that are interposed in the clearance gap to be measured. Through trial and error, the gauge element of known thickness is matched to the gap and, thus, the clearance of the gap determined. For reasons of accuracy, these materials are usually very hard, non-resilient steel which will not compress during use.

In setting the height of a machine tool above the workpiece, it is necessary to establish either a working clearance between the tool at its retracted position and the workpiece, or to establish a reference point a known distance from the workpiece in order to "zero" other measurement components within the machine.

During "setup" prior to beginning machining operations, the machine is set as described above, usually by two different methods; either the machine tool is brought down into contact with the workpiece and that point determined as zero clearance between the tool and the workpiece, or a feeler gauge is used to establish a pre-determined clearance between the tool and the workpiece by inserting the gauge material between the tool and the workpiece and bringing the tool down into contact with the gauge element. Both of these procedures, however, require bringing the tool into contact with either the workpiece or the hard non-resilient material of the feeler gauge. In using either of these procedures, a delicate cutting tool can often be damaged or damage can be done to the workpiece causing both the expense of the damaged parts and loss of time.

SUMMARY OF THE INVENTION

In order to overcome the problems described above, the present device provides a resilient, non-destructive clearance gauge for setting the height of a machine tool to a known clearance above a workpiece. Using this device, a known clearance can be accurately set without the fear of damage to either the cutting tool or the workpiece.

The present device comprises a simple lever-actuated dial gauge which is supported above a workpiece by a base block. This clearance setting gauge is calibrated by first measuring a clearance of known dimension. Thereafter, this clearance can be easily re-established repeatedly without any additional adjustment to the dial indicator.

A lever arm extends beyond the base block, both to transmit motion to the dial indicator and also to extend the measurement contact point a distance away from the device so that the presence of the body of the device itself will not restrict the setup procedure. The base blocks contains a fulcrum pin which reverses the direction of motion of the lever arm and transmits the movement to the dial indicator contact point at the opposite end of the arm. In order to increase accuracy, the device is so constructed that both ends of the lever arm are parallel to the workpiece and perpendicular to both the nose of the dial indicator and line of movement of the machine tool. The spring within the dial indicator serves to resiliently bias the pedal portion of the level arm in the up position. The thickness of the lever arm at the point of contact with the cutting tool is substantially less than the clearance to be measured so that if the cutting tool is brought too far down, the lever arm will move further downward remaining resiliently biased against the cutting tool, but without contacting the workpiece and therefore possibility of damaging the cutting tool.

It will be easily understood by those of ordinary skill in the art that the geometries of the lever of mechanism detract from this device's ability to measure clearances within a particular range, but rather will only be useful in establishing clearance at one given point. Other objects and advantages of the present device will become apparent to those of ordinary skill in the art from the following drawings and description of the preferred embodiment presented herein.

BRIEF DESCRIPTION OF THE PREFERRED EMBODIMENT

Figure 1:
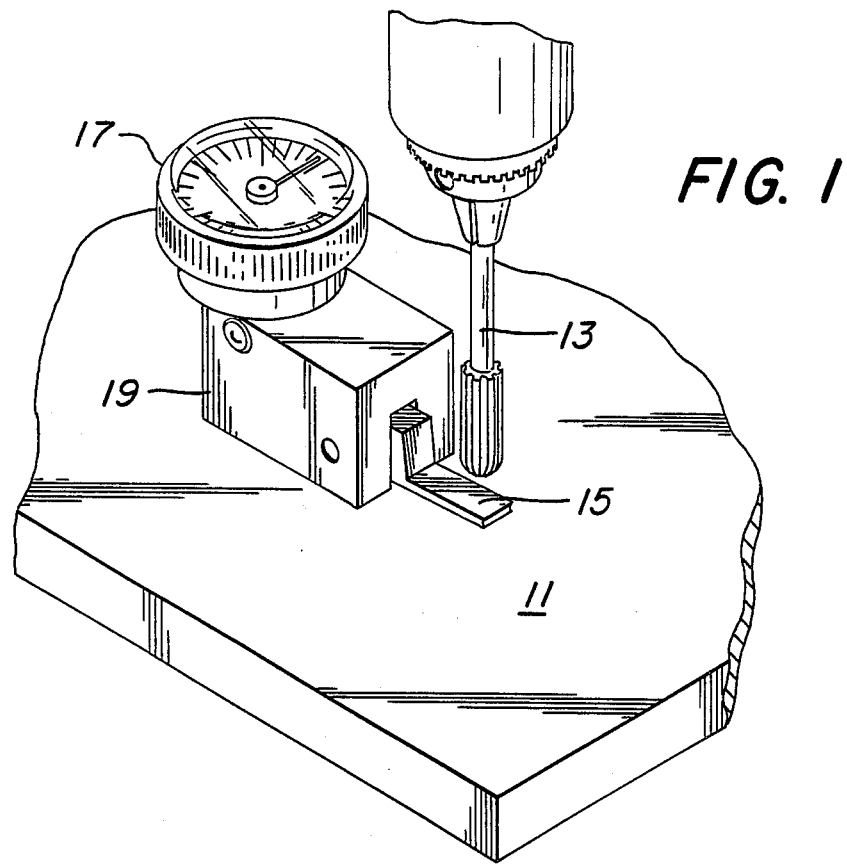
FIG. 1 is a top perspective view showing the present device in its working environment.

Referring now to FIG. 1, the present device is shown resting on workpiece 11 and positioned beneath the stroke of the cutting tool 13. Clearance indicator 17 faces vertically upward toward the operator. The indicating device includes a pedal portion 15 which contacts the cutting tool 13.

Figure 2:
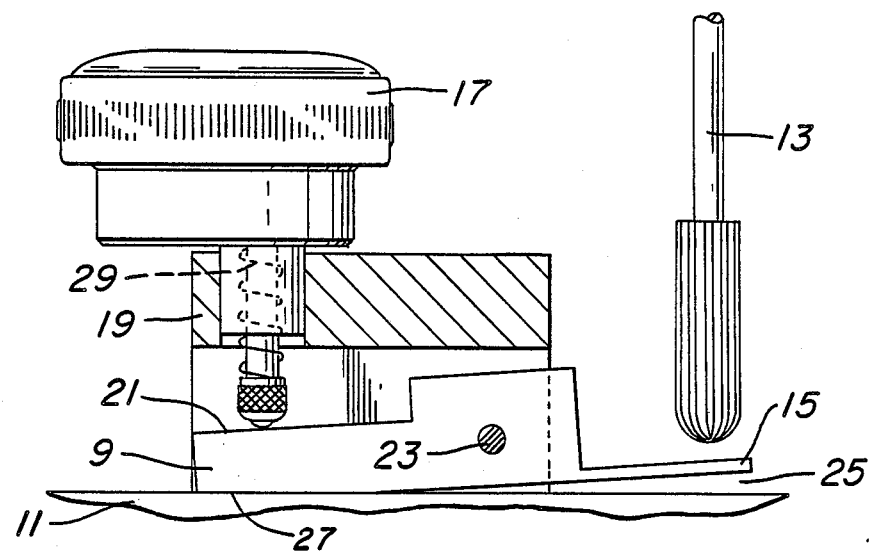
FIG. 2 is a side view.

Referring now to FIG. 2, a sectioned front view of the present device shows the construction of the internal lever arm 9 having pedal portion 15 and indicator surface 21. The lever has a fulcrum at pin 23 which travels between opposite legs of the block base 19 which form a yoke surrounding lever 9.

As shown in FIG. 2, the present device is shown at rest position with resilient means 29 located within dial indicator 17 biasing lever arm 9 downward at indicator surface 21. Lever 9 contains a bottom portion 27 at one end which contacts the workpiece and establishes a stop for the greatest upward travel of pedal portion 15.

Figure 3:
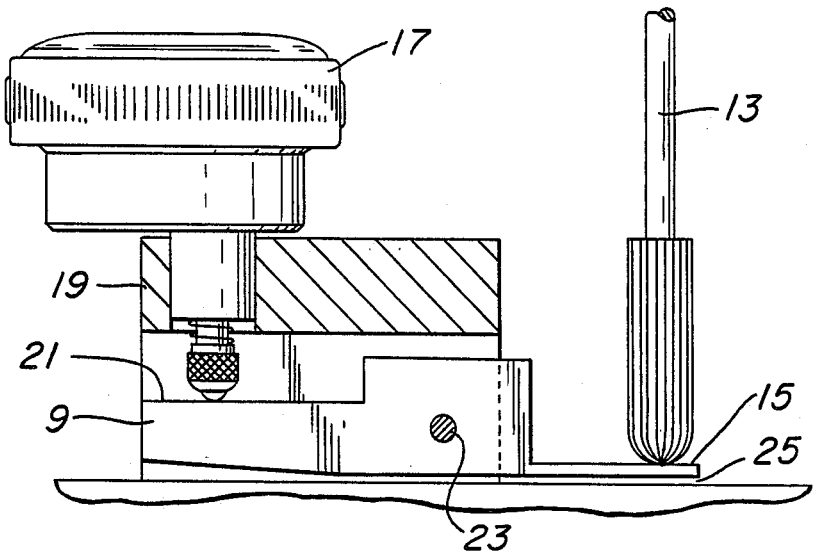
FIG. 3 is a side view showing the cutting tool adjusted to its setup clearance.

Referring now to FIG. 3, the mechanical relations shown in FIG. 2 are now shown with the cutting tool 13 brought down against pedal portion 15 to establish the setup clearance. Lever arm 9 has now been moved so that indicator surface 21 has moved the dial indicator shaft 29 upward. The position shown in the figure is the desired set point.

As shown in this position, measurement indicator surface 21 and top surface of pedal portion 15 are parallel to each other and to the top surface of workpiece 11. Because of these parallel relations, the machine tool can be brought down at any point along the pedal portion and produce an accurate reading. The thickness of pedal portion 15 is substantially less than the desired distance between the end of the cutting tool at setup position and the top surface of the workpiece so that a gap 25 remains beneath the pedal portion. This gap permits the operator to extend the stroke of the cutting plane beyond the desired clearance closer to the workpiece without making hard contact. Gap 25 varies with the height of the cutting tool 13 being held resiliently there against by the resilient means 29 within the measurement device 17.

Figure 4:
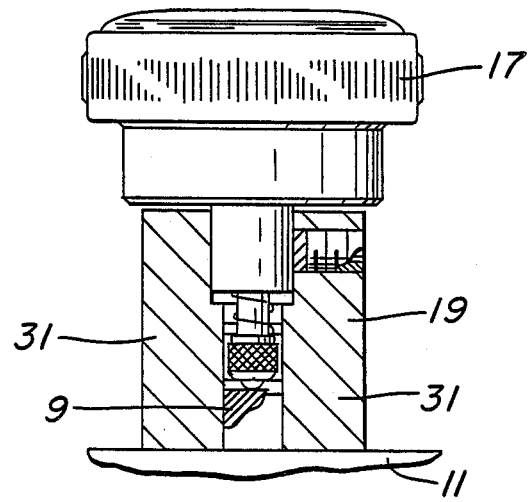
FIG. 4 is a sectional end view.

Referring now to FIG. 4, an end sectional view of the base block is shown. Two legs support the measurement indicator means and forms the sides of a yoke with lever 9 held therebetween. The base block 19 is formed of a heavy material or weighted so that the resilient means within the dial indicator 17 may be easily overcome without any tipping or other movement of the base portion. This permits smooth and accurate use of the device.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A clearance gauge for setting the distance between a machine tool and a workpiece, comprising:
   a. a base in contact relation with said workpiece, said base, including an inverted yoke open at the bottom for supporting a lever,
   b. lever means rotatably affixed to the base, said lever means having a first and second end and a fulcrum pin located therebetween,
   c. a pedal portion of said lever means at said first end having a top surface for contacting said machine tool,
   d. an indicator surface at the top of said second end of said lever means,
   e. resilient means biasing said second end of said lever arm in a downward direction, and
   f. height indicator means in contacting relation with said indicator surface.

2. The clearance gauge of claim 1 further described in that said indicator surface and said top surface of said pedal portion lie in planes parallel to top surface of said workpiece at a point of rotation of said lever means wherein the top surface of said pedal portion is the distance from the workpiece that the machine tool is to be set.

3. The clearance gauge of claim 2 further including a right and left legs being a part of said base and forming a yoke which carries opposite ends of said fulcrum pin.

4. The clearance gauge of claim 3 further described in that said height indicator means is a dial indicator.

5. The clearance gauge of claim 1 further described in that said pedal portion has a thickness substantially less than the distance between the top of said pedal portion and the workpiece when said pedal portion is oriented parallel to said workpiece.

6. A clearance gauge for setting the distance between a machine tool and a workpiece, comprising:
   a. a tool for performing a machining operation upon a workpiece;
   b. a base having two legs which form an inverted yoke, said base resting upon said workpiece;
   c. a lever means rotatably affixed between the legs of said base, said lever means having a first and second end and fulcrum located equidistant therebetween;
   d. a pedal of said lever means at said first end, said pedal portion extending a distance from said base and havig a top surface for contacting said machine tool;
   e. an indicator surface at the top of said second end of said lever means;
   f. a resilient means biasing said second end of said lever means in downward direction;
   g. said lever means further including a bottom portion on said second end which acts as a stop, contacting said workpiece when said pedal portion has reached its maximum height;
   h. indicator means in contacting relation with said indicator surface;
   i. said pedal portion having a thickness substantially less than the distance between the top of said pedal portion and the workpiece when the pedal portion is oriented parallel to said workpiece; and
   j. said fulcrum pin, said yoke and said lever means arranged so that the clearance distance to be set equals the distance between the top of said pedal portion and said workpiece at the point of rotation of said lever means where the top surfaces of said lever means are parallel to the top surfaces of said workpiece.

7. The clearance gauge of claim 6 further described in that there exists a gap between said pedal and said workpiece at the set point.

* * * * *